(12) United States Patent
Lonkar

(10) Patent No.: US 11,863,508 B2
(45) Date of Patent: *Jan. 2, 2024

(54) PROGRESSIVE ATTACHMENTS SYSTEM

(71) Applicant: Snap Inc., Santa Monica, CA (US)

(72) Inventor: Chinmay Lonkar, Playa Vista, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/709,499

(22) Filed: Mar. 31, 2022

(65) Prior Publication Data

US 2022/0224662 A1 Jul. 14, 2022

Related U.S. Application Data

(63) Continuation of application No. 16/042,685, filed on Jul. 23, 2018, now Pat. No. 11,323,398.

(Continued)

(51) Int. Cl.
*H04L 51/08* (2022.01)
*H04L 51/046* (2022.01)
(Continued)

(52) U.S. Cl.
CPC ............ *H04L 51/08* (2013.01); *H04L 51/046* (2013.01); *H04L 51/52* (2022.05); *G06F 3/04883* (2013.01)

(58) Field of Classification Search
CPC ..... H04L 51/08; H04L 51/52; G06F 3/04883; G06Q 30/0269
(Continued)

(56) References Cited

U.S. PATENT DOCUMENTS

| 5,754,939 A | 5/1998 | Herz et al. |
| 6,038,295 A | 3/2000 | Mattes |

(Continued)

FOREIGN PATENT DOCUMENTS

| CA | 2887596 A1 | 7/2015 |
| CN | 103049761 B | 8/2016 |

(Continued)

OTHER PUBLICATIONS

U.S. Appl. No. 16/042,685, filed Jul. 23, 2018, Systems, Devices, and Methods for Progressive Attachments.

(Continued)

*Primary Examiner* — James N Fiorillo
(74) *Attorney, Agent, or Firm* — Schwegman Lundberg & Woessner, P.A.

(57) ABSTRACT

Disclosed are systems, methods, and computer-readable storage media to provide for progressive display of attachments on a mobile device. In some aspects, a method includes determining a sequence of media for presentation to a user, determining to insert new media between two media of the sequence of media. In some aspects, the new media may be a short form video. The method may further include receiving touch screen input while presenting the new media, and presenting additional media in response to the touch screen input. In some aspects, the additional media may be a long form video. In some aspects, additional input may be received while the additional media is presented. The new input may request a further media be presented. The further media may be a software installation dialog or a web page.

20 Claims, 12 Drawing Sheets

Related U.S. Application Data

(60) Provisional application No. 62/539,345, filed on Jul. 31, 2017.

(51) Int. Cl.
*H04L 51/52* (2022.01)
*G06F 3/04883* (2022.01)

(58) Field of Classification Search
USPC .......................................................... 709/206
See application file for complete search history.

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 7,971,156 B2 | 6/2011 | Albertson et al. |
| 7,996,793 B2 | 8/2011 | Latta et al. |
| 8,131,597 B2 | 3/2012 | Hudetz |
| 8,169,916 B1* | 5/2012 | Pai ..................... H04N 21/2181 709/200 |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,487,938 B2 | 7/2013 | Latta et al. |
| 8,549,575 B2* | 10/2013 | Amento ............. H04N 21/2407 725/86 |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,856,691 B2 | 10/2014 | Geisner et al. |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,043,850 B2* | 5/2015 | Hoffert ............... H04L 65/60 725/43 |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,230,160 B1 | 1/2016 | Kanter |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,323,398 B1 | 5/2022 | Lonkar |
| 11,531,402 B1 | 12/2022 | Stolzenberg |
| 11,546,505 B2 | 1/2023 | Canberk |
| 2002/0047868 A1 | 4/2002 | Miyazawa |
| 2002/0144154 A1 | 10/2002 | Tomkow |
| 2002/0169540 A1* | 11/2002 | Engstrom .......... H04N 21/4331 455/414.3 |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0098165 A1 | 5/2004 | Butikofer |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |

(56) References Cited

U.S. PATENT DOCUMENTS

| | | | |
|---|---|---|---|
| 2007/0098165 A1* | 5/2007 | Yoshikawa | H04N 7/163 348/E7.056 |
| 2007/0214216 A1 | 9/2007 | Carrer et al. | |
| 2007/0233801 A1 | 10/2007 | Eren et al. | |
| 2008/0033812 A1* | 2/2008 | McKenna | H04N 13/194 717/116 |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0012788 A1 | 1/2009 | Gilbert et al. | |
| 2009/0042588 A1 | 2/2009 | Lottin et al. | |
| 2009/0132453 A1 | 5/2009 | Hangartner et al. | |
| 2010/0046918 A1* | 2/2010 | Takao | H04N 5/782 709/219 |
| 2010/0082427 A1 | 4/2010 | Burgener et al. | |
| 2010/0131880 A1 | 5/2010 | Lee et al. | |
| 2010/0131895 A1* | 5/2010 | Wohlert | H04L 65/764 709/219 |
| 2010/0185665 A1 | 7/2010 | Horn et al. | |
| 2010/0274674 A1* | 10/2010 | Roberts | H04N 21/8456 715/720 |
| 2010/0306669 A1 | 12/2010 | Della Pasqua | |
| 2011/0099507 A1 | 4/2011 | Nesladek et al. | |
| 2011/0145564 A1 | 6/2011 | Moshir et al. | |
| 2011/0200304 A1* | 8/2011 | Rutledge | H04N 21/6587 386/248 |
| 2011/0202598 A1 | 8/2011 | Evans et al. | |
| 2011/0213845 A1 | 9/2011 | Logan et al. | |
| 2011/0286586 A1 | 11/2011 | Saylor et al. | |
| 2011/0301934 A1 | 12/2011 | Tardif | |
| 2011/0320373 A1 | 12/2011 | Lee et al. | |
| 2012/0028659 A1 | 2/2012 | Whitney et al. | |
| 2012/0117584 A1* | 5/2012 | Gordon | H04N 21/812 725/19 |
| 2012/0184248 A1 | 7/2012 | Speede | |
| 2012/0209921 A1 | 8/2012 | Adafin et al. | |
| 2012/0209924 A1 | 8/2012 | Evans et al. | |
| 2012/0233631 A1* | 9/2012 | Geshwind | H04N 21/44016 725/35 |
| 2012/0254325 A1 | 10/2012 | Majeti et al. | |
| 2012/0278692 A1 | 11/2012 | Shi | |
| 2012/0278725 A1* | 11/2012 | Gordon | H04N 21/858 715/738 |
| 2012/0304080 A1 | 11/2012 | Wormald et al. | |
| 2013/0071093 A1 | 3/2013 | Hanks et al. | |
| 2013/0194301 A1 | 8/2013 | Robbins et al. | |
| 2013/0227038 A1* | 8/2013 | Rich | H04L 65/60 709/206 |
| 2013/0290443 A1 | 10/2013 | Collins et al. | |
| 2013/0326361 A1* | 12/2013 | Kendal | H04L 51/10 709/206 |
| 2014/0032682 A1 | 1/2014 | Prado et al. | |
| 2014/0122787 A1 | 5/2014 | Shalvi et al. | |
| 2014/0129942 A1* | 5/2014 | Rathod | H04N 21/44226 715/720 |
| 2014/0171036 A1 | 6/2014 | Simmons | |
| 2014/0201527 A1 | 7/2014 | Krivorot | |
| 2014/0223307 A1* | 8/2014 | McIntosh | H04N 21/47217 715/719 |
| 2014/0223462 A1* | 8/2014 | Aimone | H04N 21/4307 725/10 |
| 2014/0282096 A1 | 9/2014 | Rubinstein et al. | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2015/0113404 A1* | 4/2015 | Agnoli | G11B 27/031 715/723 |
| 2015/0120293 A1 | 4/2015 | Wohlert et al. | |
| 2015/0199082 A1 | 7/2015 | Scholler et al. | |
| 2015/0227602 A1 | 8/2015 | Ramu et al. | |
| 2015/0245103 A1* | 8/2015 | Conte | G06Q 30/0643 725/60 |
| 2015/0271117 A1* | 9/2015 | Massand | G06F 3/0481 715/752 |
| 2015/0281764 A1* | 10/2015 | Stathacopoulos | H04N 21/4821 725/41 |
| 2015/0370320 A1 | 12/2015 | Connor | |
| 2015/0370402 A1* | 12/2015 | Checkley | G06F 3/0487 345/173 |
| 2016/0011758 A1* | 1/2016 | Dornbush | H04N 5/77 715/764 |
| 2016/0014461 A1* | 1/2016 | Leech | H04N 21/4668 725/14 |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0162953 A1* | 6/2016 | Tang | G06Q 30/0269 705/14.66 |
| 2016/0180887 A1 | 6/2016 | Sehn | |
| 2016/0219119 A1* | 7/2016 | Yu | H04L 67/10 |
| 2016/0227291 A1* | 8/2016 | Shaw | H04N 21/4826 |
| 2016/0253710 A1* | 9/2016 | Publicover | H04W 4/21 705/14.66 |
| 2016/0267126 A1* | 9/2016 | Olson | G06F 16/9535 |
| 2016/0277419 A1 | 9/2016 | Allen et al. | |
| 2016/0321708 A1 | 11/2016 | Sehn | |
| 2016/0353168 A1* | 12/2016 | Allen | H04N 21/2743 |
| 2016/0359957 A1 | 12/2016 | Laliberte | |
| 2016/0359987 A1 | 12/2016 | Laliberte | |
| 2017/0099239 A1* | 4/2017 | Zhang | H04L 51/10 |
| 2017/0123487 A1 | 5/2017 | Hazra et al. | |
| 2017/0161382 A1 | 6/2017 | Ouimet et al. | |
| 2017/0201478 A1* | 7/2017 | Joyce | H04L 51/214 |
| 2017/0214642 A1* | 7/2017 | Tichauer | H04L 67/02 |
| 2017/0238043 A1* | 8/2017 | Zvinakis | H04N 21/422 725/38 |
| 2017/0263029 A1 | 9/2017 | Yan et al. | |
| 2017/0277684 A1 | 9/2017 | Dharmarajan Mary | |
| 2017/0277685 A1 | 9/2017 | Takumi | |
| 2017/0287006 A1 | 10/2017 | Azmoodeh et al. | |
| 2017/0295250 A1 | 10/2017 | Samaranayake et al. | |
| 2017/0351910 A1 | 12/2017 | Elwazer et al. | |
| 2017/0353416 A1* | 12/2017 | Brooks | H04L 51/04 |
| 2017/0357382 A1* | 12/2017 | Miura | G06F 16/438 |
| 2017/0374003 A1 | 12/2017 | Allen et al. | |
| 2017/0374508 A1 | 12/2017 | Davis et al. | |
| 2018/0007446 A1* | 1/2018 | McLean | H04N 21/47217 |
| 2018/0067641 A1* | 3/2018 | Lerner | H04L 51/52 |
| 2018/0091728 A1* | 3/2018 | Brown | G11B 27/34 |
| 2018/0101297 A1* | 4/2018 | Yang | G06F 3/04883 |
| 2018/0143748 A1* | 5/2018 | Ahmed | H04N 21/4622 |
| 2018/0158370 A1 | 6/2018 | Pryor | |
| 2018/0160195 A1* | 6/2018 | Redmond | G06Q 30/0251 |
| 2018/0192130 A1* | 7/2018 | Liston | H04N 21/42204 |
| 2018/0225725 A1* | 8/2018 | Paul | H04N 21/812 |
| 2018/0241871 A1* | 8/2018 | Sarafa | H04W 12/0431 |
| 2018/0343484 A1* | 11/2018 | Loheide | H04N 21/23424 |
| 2019/0076741 A1* | 3/2019 | Thompson | H04N 21/21805 |
| 2019/0146219 A1 | 5/2019 | Rodriguez, II | |
| 2019/0166074 A1* | 5/2019 | Voss | H04L 51/224 |
| 2019/0250812 A1* | 8/2019 | Davydov | G06F 3/0482 |
| 2019/0342618 A1* | 11/2019 | Dudko | H04N 21/4825 |
| 2020/0193482 A1* | 6/2020 | Howard | H04M 1/7243 |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0306812 A1* | 9/2021 | Gross | G06F 3/016 |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |

(56) References Cited

U.S. PATENT DOCUMENTS

| | | |
|---|---|---|
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |

FOREIGN PATENT DOCUMENTS

| | | |
|---|---|---|
| EP | 3707693 A1 | 9/2020 |
| EP | 4172726 A1 | 5/2023 |
| EP | 4172730 A1 | 5/2023 |
| KR | 20220158824 A | 12/2022 |
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016168591 A1 | 10/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"U.S. Appl. No. 16/042,685, Advisory Action dated Aug. 13, 2020", 4 pgs.
"U.S. Appl. No. 16/042,685, Examiner Interview Summary dated Jul. 2, 2021", 3 pgs.
"U.S. Appl. No. 16/042,685, Final Office Action dated Jun. 19, 2020", 38 pgs.
"U.S. Appl. No. 16/042,685, Final Office Action dated Oct. 15, 2021", 47 pgs.
"U.S. Appl. No. 16/042,685, Non Final Office Action dated Apr. 20, 2021", 39 pgs.
"U.S. Appl. No. 16/042,685, Non Final Office Action dated Oct. 20, 2020", 40 pgs.
"U.S. Appl. No. 16/042,685, Non Final Office Action dated Dec. 20, 2019", 20 pgs.
"U.S. Appl. No. 16/042,685, Notice of Allowance dated Jan. 3, 2022", 11 pgs
"U.S. Appl. No. 16/042,685, Response filed Jan. 18, 2021 to Non Final Office Action dated Oct. 20, 2020", 12 pgs.
"U.S. Appl. No. 16/042,685, Response filed Mar. 11, 2020 to Non Final Office Action dated Dec. 20, 2019", 11 pgs.
"U.S. Appl. No. 16/042,685, Response filed Jul. 20, 2021 to Non Final Office Action dated Apr. 20, 2021", 12 pages.
"U.S. Appl. No. 16/042,685, Response filed Jul. 22, 2021 to Final Office Action dated Jun. 19, 2020", 13 pgs.
"U.S. Appl. No. 16/042,685, Response filed Dec. 1, 2021 to Final Office Action dated Oct. 15, 2021", 11 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Vaas, Lisa, "Stealth Text, Should You Choose to Accept It", [Online] Retrieved from the Internet: <URL: http://www.eweek.com/print/c/a/MessagingandCollaboration/StealthTextShouldYouChooseto AcceptIt>, (Dec. 13, 2005), 2 pgs.

* cited by examiner

PROGRESSIVE ATTACHMENTS SYSTEM

CROSS REFERENCE TO RELATED APPLICATIONS

This application is a continuation of U.S. patent application Ser. No. 16/042,685, filed on Jul. 23, 2018, which claims priority to U.S. Provisional Application No. 62/539,345, filed Jul. 31, 2017, and entitled "SYSTEMS, DEVICES, AND METHODS FOR PROGRESSIVE ATTACHMENTS." The contents of these prior applications are considered part of this application, and are hereby incorporated by reference in their entireties.

TECHNICAL FIELD

The present disclosure generally relates to the technical field of managing the display of content to users of a social network. Specifically, disclosed are methods for progressively providing more detailed information to a user of a social network based on the user's request.

BACKGROUND

Social network members utilize social messaging systems for a variety of purposes. Some members utilize the social messaging system to provide member to member communication, similar to email, which may be available between members. Other members may primarily share content. For example, a first member may upload particular content to the messaging system. The messaging system may alert a second user that the content is available. The second user may then view the content. Because users of social networking systems have varying interests and uses for functionality provided by the social networking system, methods and systems to progressively adapt to requests by the user for information are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
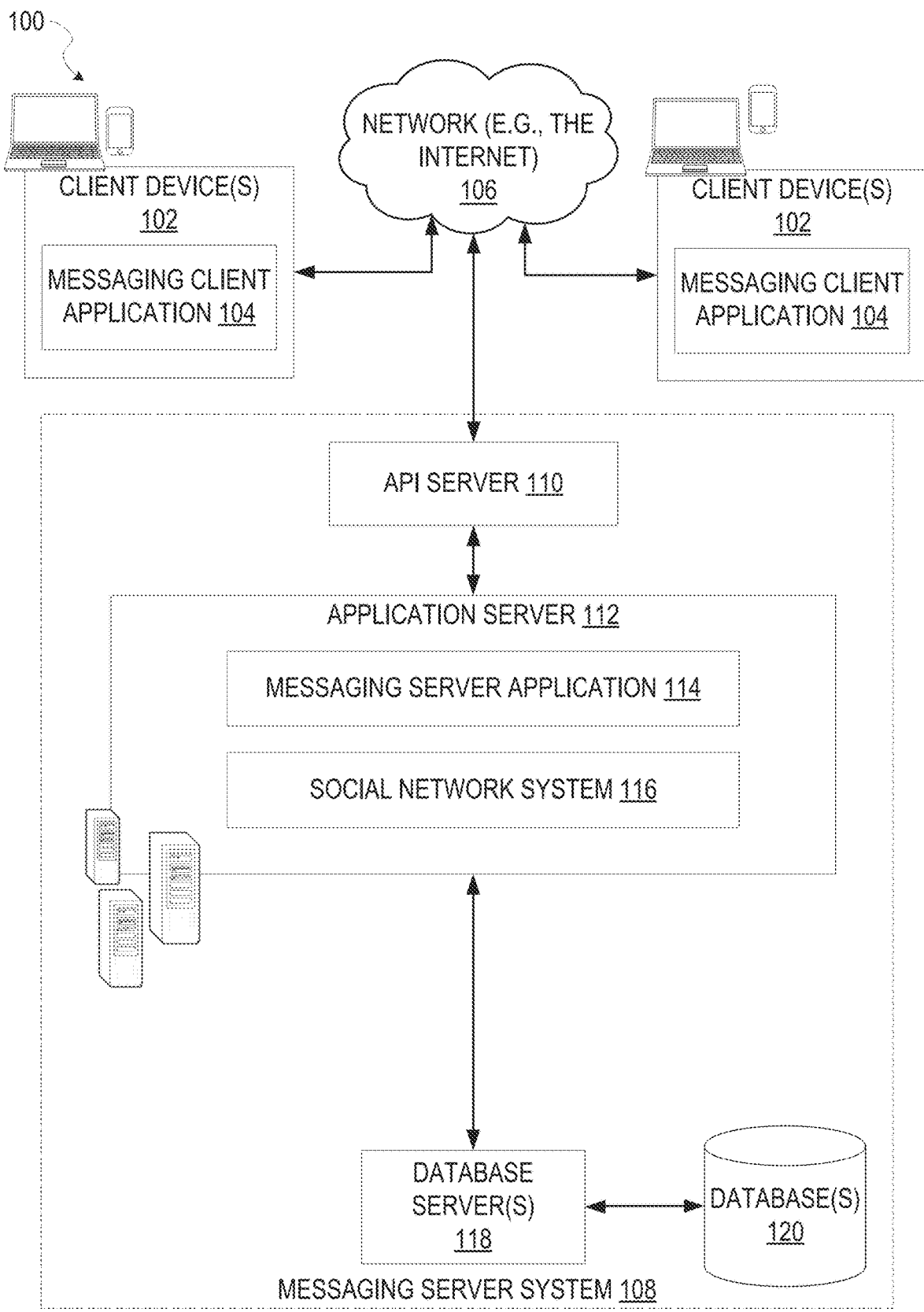
FIG. 1 is an exemplary block diagram of a messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products that provide for progressive insertion of additional content into a sequence of content based on input from a user. For example, in some aspects, an advertisement may be inserted into a sequence of content being viewed by the user. If the advertisement is of particular interest to the user, the user may indicate a request for additional information. For example, the user may perform a "swipe up" gesture in response to the advertisement to indicate their interest in more information. Upon receiving the request, the social messaging system may present additional content to the user providing further information. In some aspects, this additional content may take the form of a long form video, which describes more detailed information on a particular topic to the user. In response to learning more about the subject area from the additional content, the user may decide to perform additional actions. For example, the additional content may convey benefits associated with installation of a particular third party application on the user's device. If the user desires the benefits described by the additional content, the user may agree to proceed with an installation of the third party application. Alternatively, the additional content may describe benefits that may be obtained via a web interface. Upon agreement by the user, the social networking system may facilitate a visit to the web interface for the user. For example, the social network system may open the web interface within a browser that is pre-installed on the user's mobile device. The web interface may provide a number of features useful to the user.

In some aspects, a user may select to view a sequence of content. The sequence may be defined, in some aspects, by a chronological order in which the content was added to a messaging system. In other aspects, the sequence may be defined by a user. For example, a first user may arrange content into a particular sequence, such that a second user views the content, the content is presented to the user in the sequence as arranged by the first user. As the second user is viewing the content, additional content may be inserted into the sequence. For example, in some aspects, the additional content may be inserted periodically.

In some aspects, the additional content may provide a brief description of a subject area. In some aspects, the additional content may include a short video. The video may provide a brief introduction to a subject area. In some aspects, the additional content may be displayed within a user interface that can accept at least two types of input. A first type of input may request that the user be returned to the sequence of content. For example, a "swipe down" input may indicate that the user requests that the display of the additional content be stopped, and the user returned to the sequence of content. A second type of input may indicate the user requests second additional contet relating to the first additional content. For example, in some aspects, a "swipe up" gesture may signal a request for second additional content. In response to the second type of input, further information may be displayed. In some aspects that utilize a video for the additional content, a longer video may be provided as the second additional information. The second additional information may be displayed in a user interface that also accepts at least two types of input. Similar to the first user interface described above, the second user interface may also accept input requesting a return to the sequence of content. A second type of input may request third additional information. For example, the first additional information may include an installation dialog, enabling the user to install software, or the third additional information may be a web link, enabling the user to link to web content in a browser application.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

The disclosed methods and systems may utilize the messaging system 100 to provide for progressive presentation of content on one or more client devices 102, as explained in more detail below.

Figure 2:
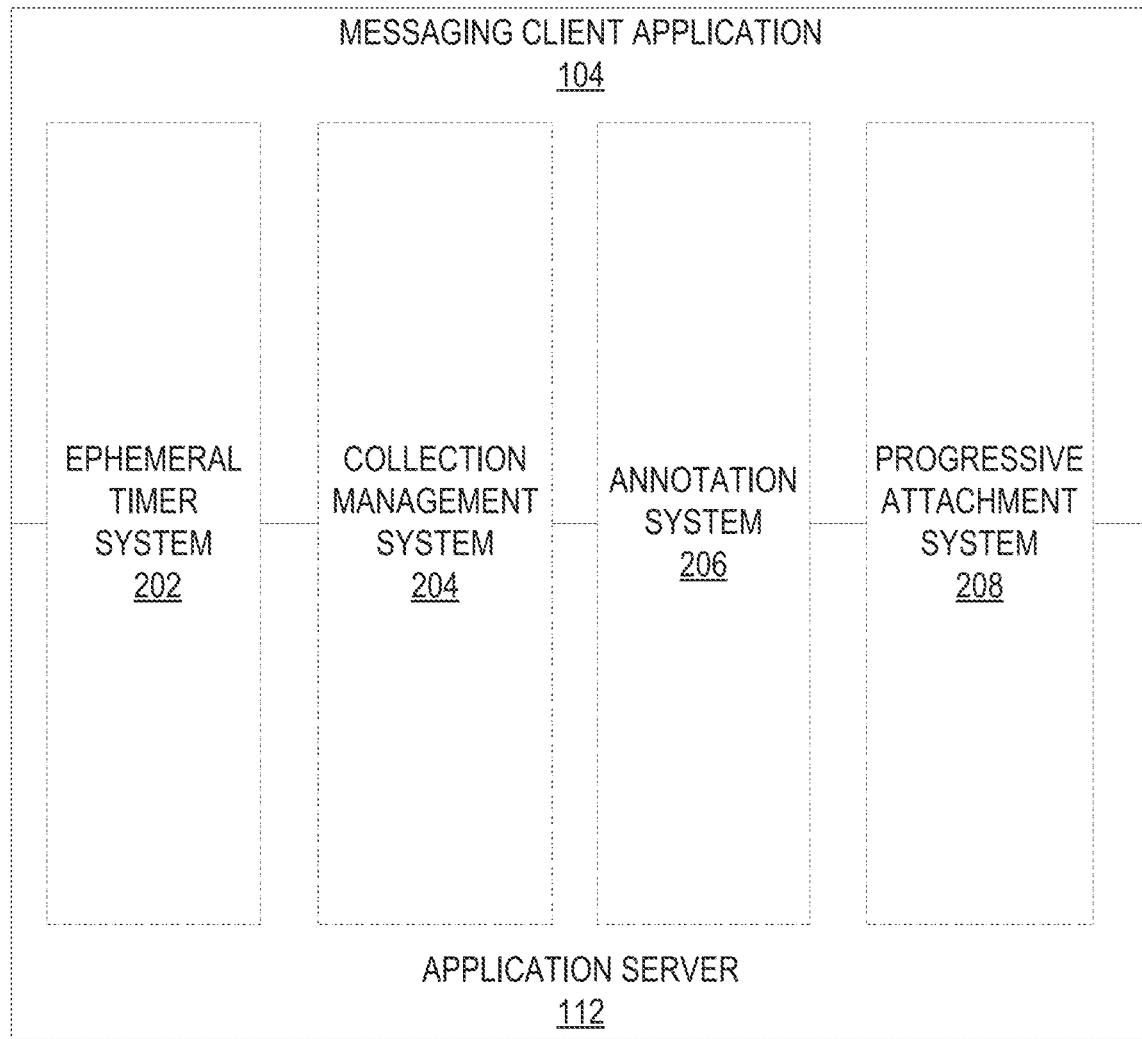
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and a progressive attachment system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The progressive attachment system 208 may provide for the insertion of content into a sequence of other content. For example, in some aspects, the progressive attachment system 208 may insert content into a sequence of the other content periodically, for example, after a period of time elapses. In some aspects, the progressive attachment system may provide for a user to control an amount of content inserted into the sequence of content. For example, user input may indicate that no further content is to be inserted into the sequence of content after presentation of a first piece of content. Alternatively, the user input may indicate a request to insert additional content into the sequence of content after the user has viewed and considered the first piece of content.

Figure 3:
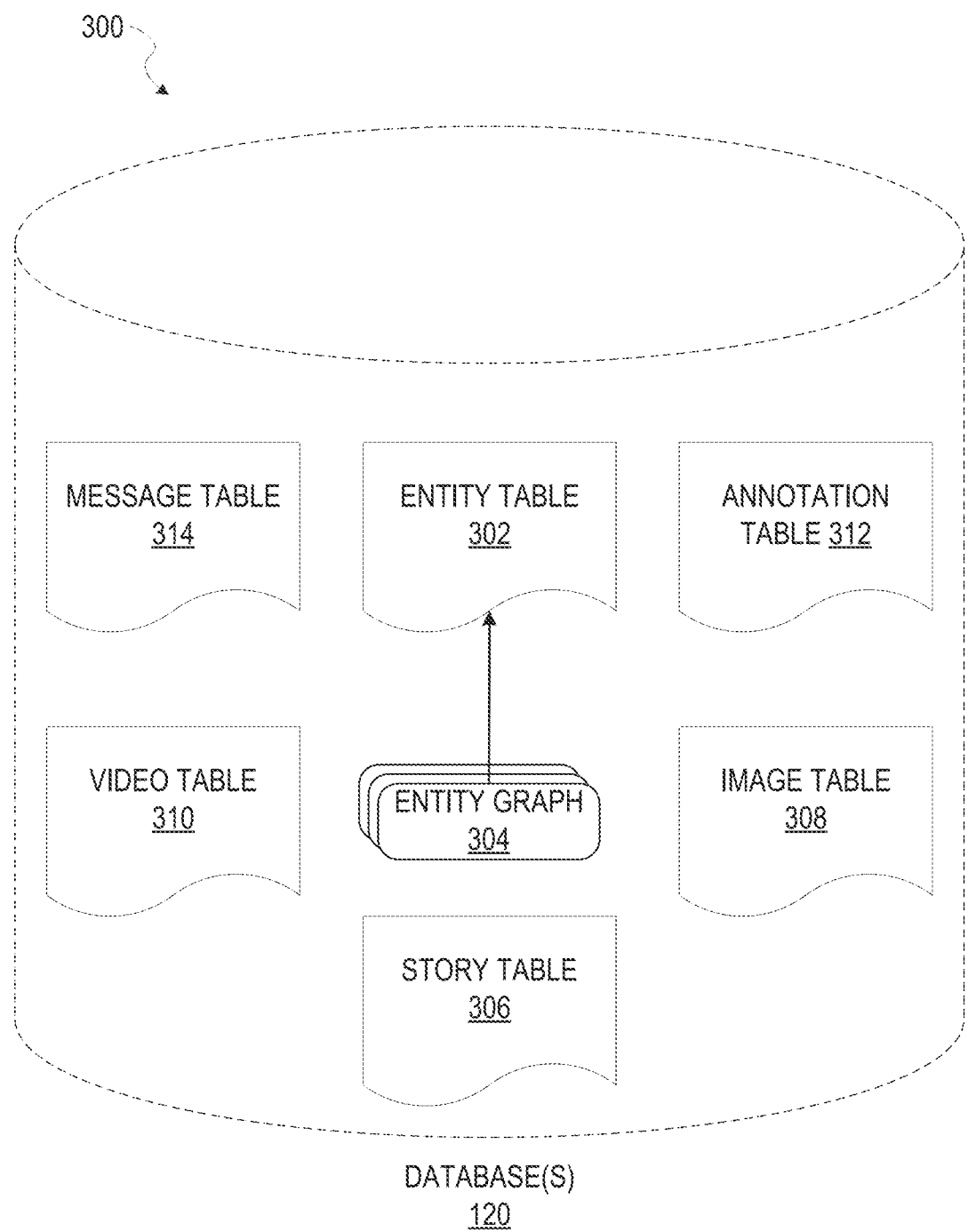
FIG. 3 is an exemplary data base schema utilized by the messaging system of FIG. 1.

FIG. 3 is a schematic diagram 300 illustrating data which may be stored in the database 120 of the messaging server system 108, according to certain exemplary embodiments.

While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 608 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus). A content collection may define a sequence of content. For example, the sequence of content may be defined by an order in which the content was inserted into the collection by a user. Alternatively, the sequence may be user defined. For example, an initial sequence may be defined based on the insertion sequence. This insertion sequence may then be subsequently modified via input by the user. For example, the user may be able to drag and drop content within a user interface to define changes to the sequence of content defined by the collection. The methods and systems disclosed herein may insert further content into the sequence of content defined by the collection.

The message table 314 may be a relational database table in some aspects, with a row of the table representing a single message. In some aspects, each row in the message table may store content for the message, and a deletion time for the message. As discussed above, the ephemeral timer system 202 may delete messages according to a time associated with the message. For example, when a user creates a message, they may specify a maximum life time of the message, such as by providing an expiration date/time of the message or an amount of time the message is to remain (e.g. 3 hours). This time information may be stored in the message table 314. As discussed below, in some aspects, the time information may be adjusted based on when certain content may be viewed by a user. Additionally, time remaining for particular content/messages may effect an order in which content is viewed and/or whether additional content is inserted into a sequence of content.

Figure 4:
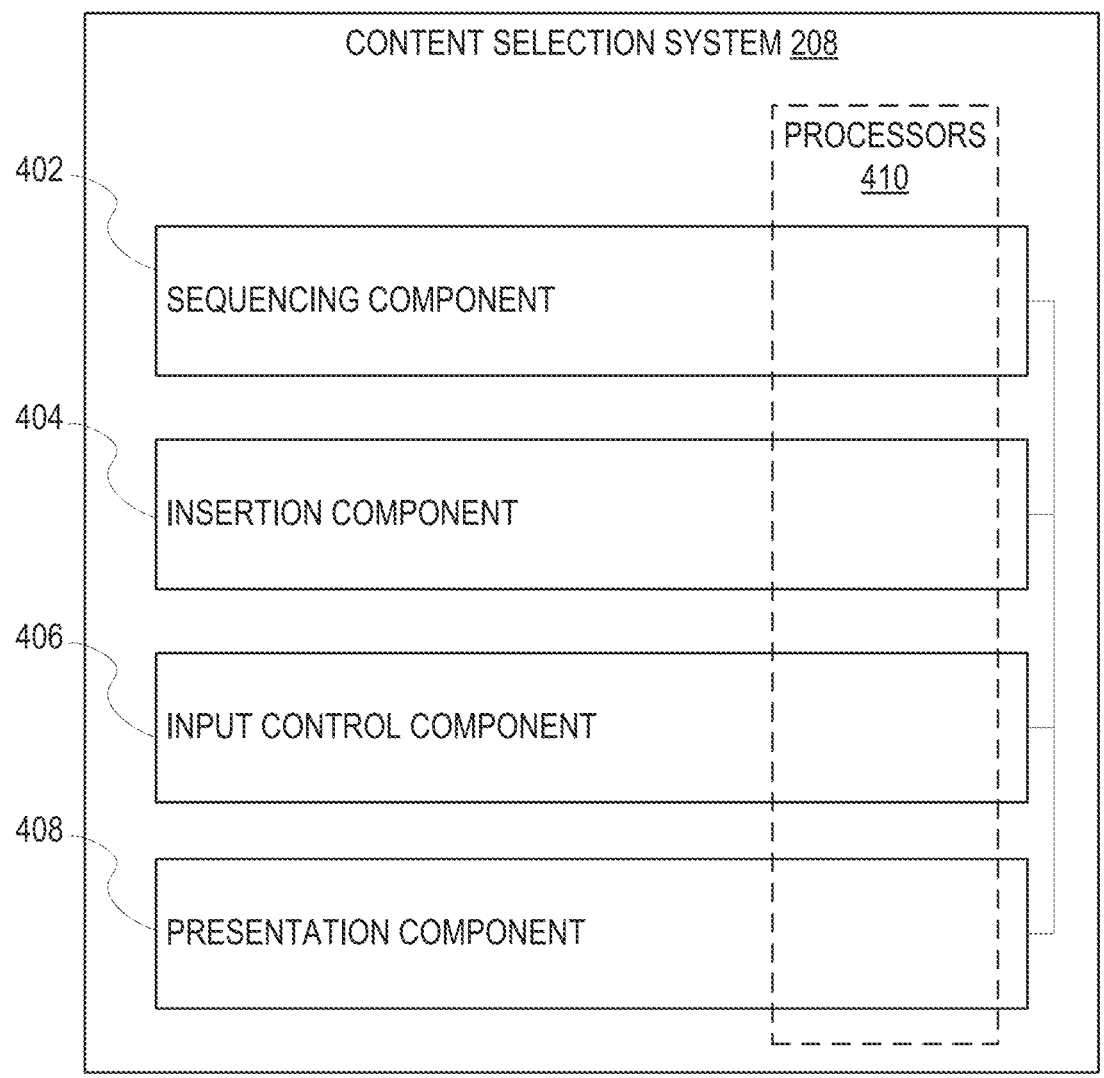
FIG. 4 is an exemplary block diagram illustrating functional components of a content selection system that forms part of the messaging system, according to some example embodiments.

FIG. 4 is a block diagram illustrating functional components of the progressive attachment system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the progressive attachment system 208 to facilitate additional functionality that is not specifically described herein. As shown, the progressive attachment system 208 includes a sequencing component, an insertion component 404, an input control component 406, and a presentation component 408.

The content sequencing component 402 identifies a sequence of media that may be presented on a display screen of a client device 102. The content sequencing component 402 may interface with the collection management system 204 to obtain the sequence of media. For example, the sequence of media may originate from an event story or event gallery as discussed above. The content sequencing component 402 may retrieve the sequence of media from the collection management system 204 in some aspects.

The insertion component 404 may be responsible for determining when to insert one or more additional media into the sequence of media. For example, in some aspects, the insertion component may determine an amount of elapsed time since a previous insertion of additional media, and determine a next time for insertion based on the elapsed time. In some aspects, the insertion component may also determine an amount of time since a user registered with the messaging system 100, and may inhibit insertions until the amount of time reaches a threshold.

The input control component 406 may receive input from a user. For example, the input control component may receive inputs indicating a "swipe up" or a "swipe down," or other inputs that may be provided via a touch device, such as a touch screen display.

The presentation component 408 may present media on an electronic display of a client device 102. In some aspects, the presented media is an image file. In other aspects, the presented media may be a video file. In some aspects, the presented media may be an installation dialog, such as a dialog enabling a user to install additional software on the client device. In some aspects, the presented media may be a web dialog.

The above referenced functional components of the progressive attachment system 208 are configured to communicate with each other (e.g., via a bus, shared memory, a switch, or APIs). Collectively, these components facilitate selective presentation of content to users.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the progressive attachment system 208 may physically include an arrangement of one or more processors 410 (e.g., a subset of or among one or more processors of a machine) configured to perform the operations described herein for that component. As another example, any component of the progressive attachment system 208 may include software, hardware, or both, that configure an arrangement of the one or more processors 410 to perform the operations described herein for that component. Accordingly, different components of the progressive attachment system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components.

Figure 5:
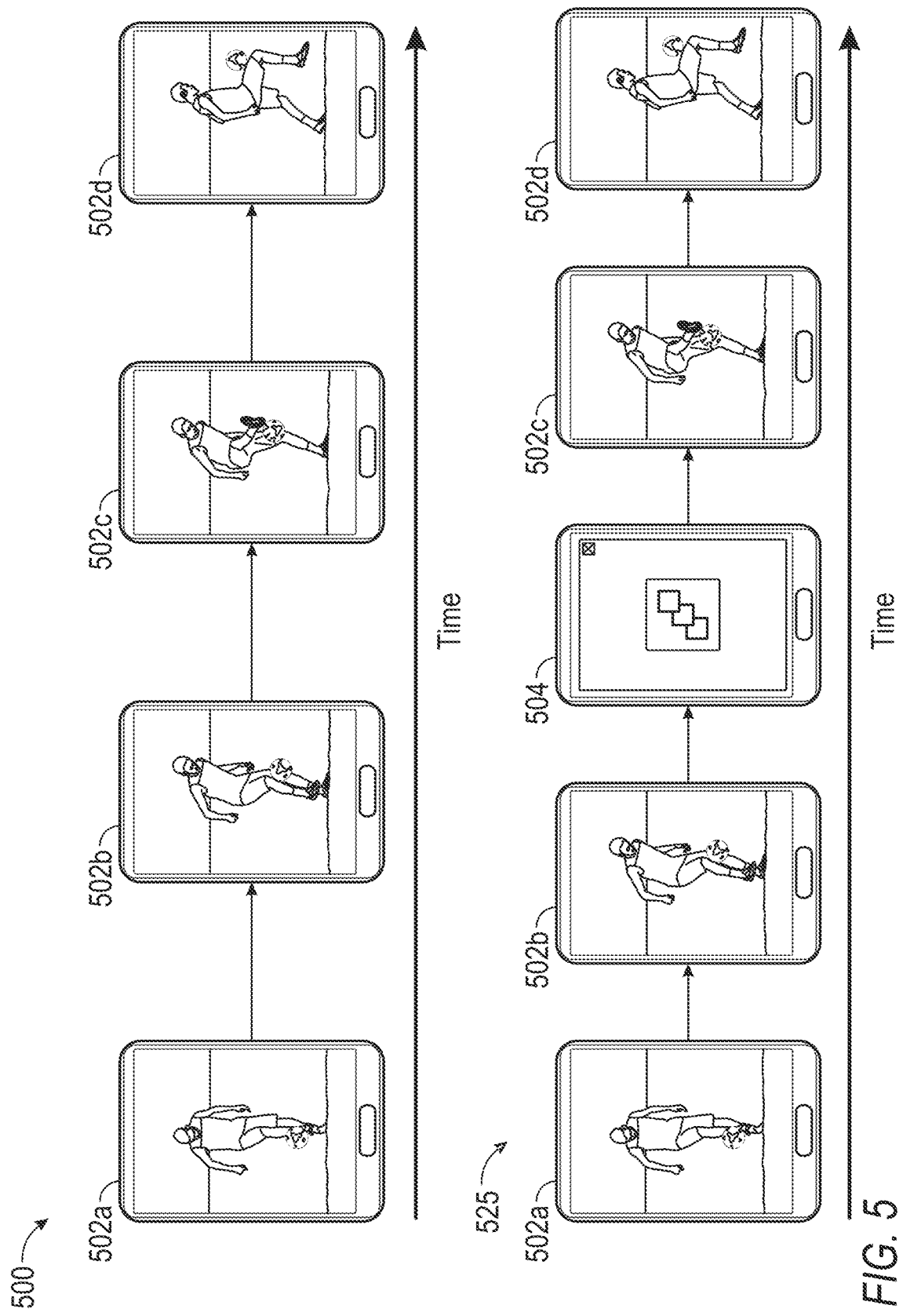
FIG. 5 shows two exemplary sequences of content display.

FIG. 5 shows two exemplary sequences of content display. The display sequence 500 includes media 502*a-d*. Media 502*a-d* may originate from an event story or an event gallery, for example, via the collection management system 204. In some aspects one or more of media 502*a-d* may be an ephemeral message. The ephemeral message may be defined to exist within the social network system 116 for a limited period of time. After the period of time elapses, the ephemeral message may be deleted by the social network system 116

The media 502*a-d* may include any form of media. For example, in some aspects, the media 502*a-d* may be images. In other aspects, the media 502*a-d* may be videos. In other aspects, the media 502*a-d* may be a mix of media types, including one or more of images, video, audio, or other forms of media. The media 502*a-d* may be part of a predefined sequence. For example, in some aspects, the sequence may be defined by an order of the media within an event story or an event gallery. In some aspects, the sequence of media may be defined when the media 502*a-d* are added to the event gallery or story. For example, in some aspects, the sequence may be a chronological sequence with respect to times at which the media was added to the event gallery or story. In some aspects, the sequence may be a chronological sequence with respect to a creation time of the media itself, which may be different than a time when the media was added to the event gallery or story.

Sequence 525 includes the sequence 500 of media 502*a-d*, but also includes an additional media 504. The additional media 504 may have been inserted between two of the media 502*b* and 502*c* of the sequence 500 (502*a-d*). In some aspects, media 504 may be a different type of media than the media 502*a-d*. For example, while media 502*a-d* may be video media in some aspects, media 504 may be a fixed image, such as a photo, in some aspects. In other aspects, the media 502*a-d* and 504 may be the same type of media.

The additional media 504 may be inserted into the sequence 500 by the insertion component 404 to form the sequence 525. In some aspects, additional media 504 may provide information on a particular subject. In some aspects, the media 502*a-d* may be media that are included as part of an event gallery or story, for example, as defined by a first user. A second user may then view the first user's story, and view the media 502*a-d* in an order defined by the sequence 502*a-d*. The insertion component 404 may determine, based on one or more criteria, that additional media is to be inserted at some point in the sequence 500. The exemplary sequence 525 shows the media 504 inserted between the media 502*b* and 502*c* in the sequence. In some aspects, a decision by the insertion component 404 on whether to insert additional media within the sequence 500 may be based on an amount of time remaining in any one or more ephemeral messages included in the content 502*a-d*. For example, if the insertion component determines that one or more of the content 502*a-d* may be deleted before a user completes viewing the sequence 500, the insertion component 404 may determine that additional content is to be inserted, in some aspects, to replace or augment that ephemeral content which is scheduled to be deleted within a threshold period of time. In some aspects, a view rate of content included in the sequence 500 may be determined. For example, a number of content viewed over a period of time may be used to determine the view rate. From this information, the insertion component 404 may estimate a view time of each content in the sequence 500 that has not yet been viewed. The estimated view time may then be compared to a content deletion time of any yet un viewed content within the sequence 500. If the estimated view time for particular content is after the content's deletion time, the insertion component may, in some aspects, change an order of the content for viewing such that the ephemeral content is more likely to be viewed before it is deleted. In some other aspects, new content may be inserted before the ephemeral content to augment the sequence of content and compensate for the loss of the ephemeral content before the user is likely to view it.

Figure 6:
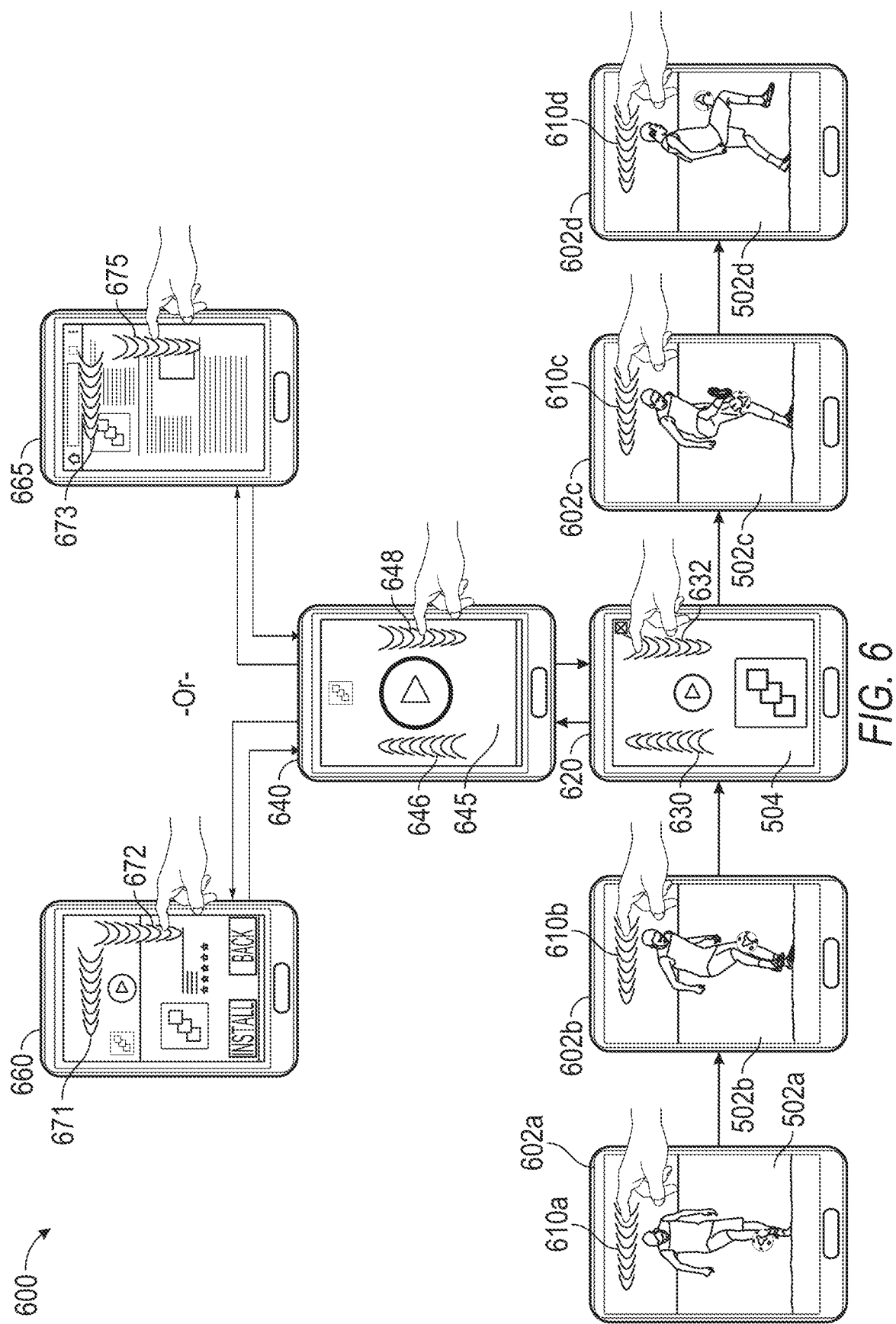
FIG. 6 is an exemplary data flow diagram for one or more of the disclosed embodiments.

FIG. 6 shows a user interface sequence 600 for displaying the media 502a-d of FIG. 5. The user interface sequence 600 includes four user interfaces 602a-d, each interface 602a-d displaying media 502a-d respectively. The sequence 600 also illustrates that user inputs, shown as exemplary left swipes 610a-d, may be used to advance the user through the sequence of media 502a-d as shown by the user interfaces 602a-d respectively.

The sequence 600 also shows the insertion of an additional user interface 620, which displays media 504. The user interface 620 is configured to receive at least two types of input. A first type of input 630 is shown as an exemplary "swipe up". A second type of input 632 is shown as an exemplary "swipe down." Upon receiving the input 632, the sequence 600 may move from user interface 620, displaying the media 504, to the user interface 602c, which is shown displaying the media 502c.

In some aspects, upon receiving the input 630, the sequence 600 is shown moving from user interface 620 to user interface 640. The user interface 640 displays media 645. In some aspects, media 645 may be a long form video, which may present information on a similar subject as media 504, but may be a longer video for example, and thus may explain the subject in more depth than media 504 in some aspects. The user interface 645 may accept at least two types of user input. A first type of input 646 may be a "swipe up" gesture. A second type of input 648 may be a "swipe down" gesture. In response to the input 648, the sequence 600 may transition from user interface 640 back to user interface 620. Alternatively, in some aspects, in response to the input 648, the sequence 600 may transition from user interface 640 to user interface 602c, which displays media 502c. In response to the input 646, the sequence 600 may transition from user interface 640 to user interface 660. If the media 645 is a video, the video may pause at a pause point when the sequence 600 transitions from the user interface 640 to the user interface 660. If the sequence 600 returns to the user interface 640, the video may resume from the pause point.

The user interface 660 may enable a user to install an addition software application on the device. Alternatively, the user interface 660 may be a web interface. The user interface 660 may receive at least two forms of input. A first form of input 671 may be a "swipe left" gesture in some aspects. The input 671 may trigger additional actions, such as installation of another software application, or opening of a web based interface. In aspects that provide a web interface implementation of user interface 660, loading of user interfaced 660 maybe initiated in response to the user interface 645 being displayed. By initiating loading of the user interface 660 upon presentation of user interface 645, delays in displaying the user interface 660 are reduced relative to implementations that would wait to load user interface 660 until it was explicitly requested by the user.

A second type of input received by user interface 660 may be a "swipe down" gesture. In response to receiving the input 672, the sequence 600 may transition from user interface 660 back to user interface 640. Alternatively, in some aspects, the sequence 600 may transition from user interface 660 to user interface 602c in response to input 672.

In some aspects, a swipe up 630 such as that illustrated with respect to content 620, may suspend ephemeral timers for any of the content 502a-d. Thus, any estimated deletion times for this content may be moved forward in time while the ephemeral timer(s) are suspended. Upon receiving the swipe down input 632, the ephemeral timer(s) for content within the sequence 502a-d may be resumed. Thus, between the time of a first input (e.g. 630) and a second input (e.g. 632), with respect to a first content of a sequence of content, one or more ephemeral timers for other content of the sequence of content may be suspended.

Figure 7:
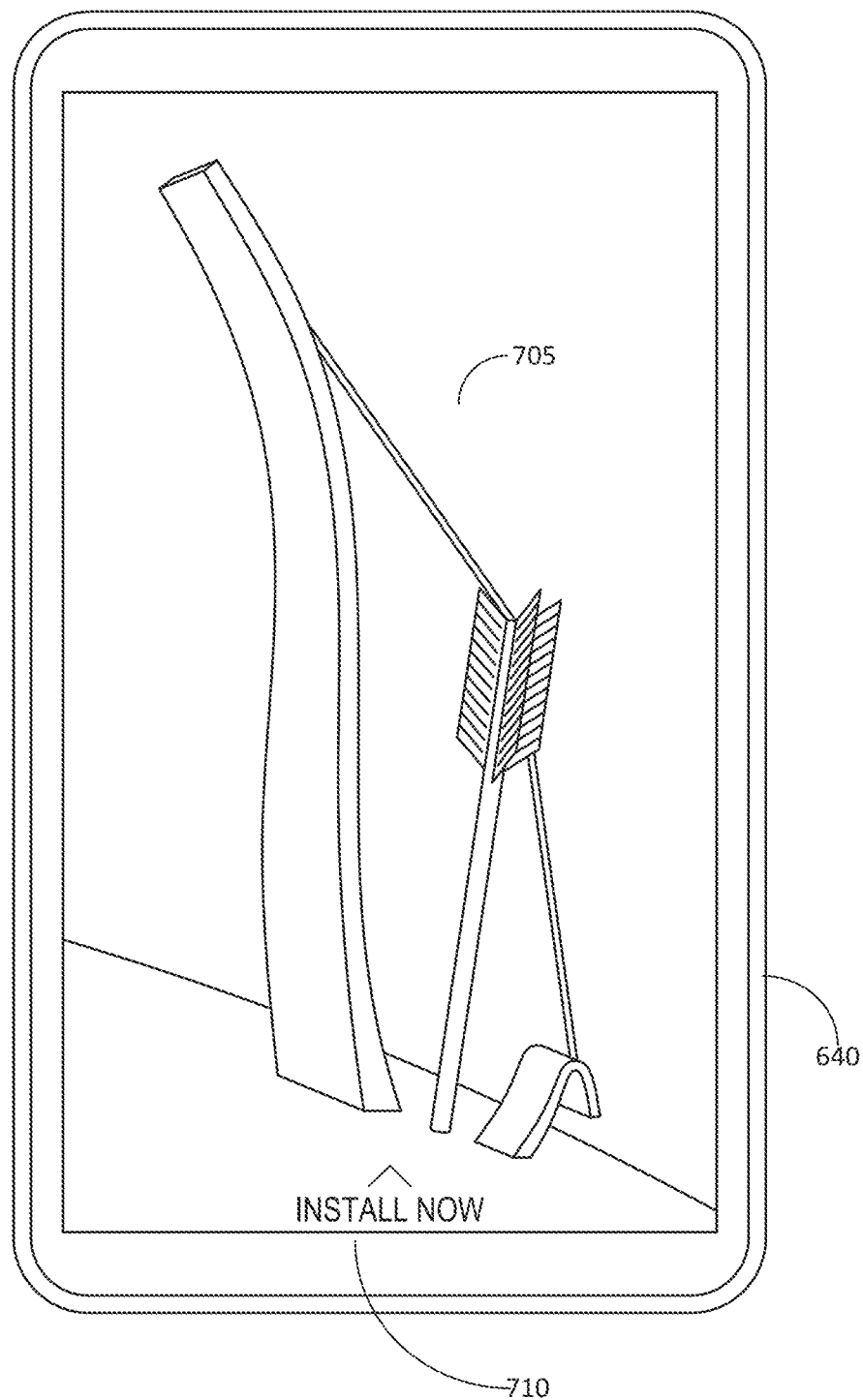
FIG. 7 is a flowchart for an exemplary method of selecting content.

FIG. 7 is an exemplary embodiment of the user interface 640 of FIG. 6. The user interface 640 of FIG. 7 shows a fixed image 705. As discussed above, the user interface 640 may receive at least two types of input. A first type of input may request a return to the user interface 620 or 602c. A second type of input may request additional information, such as that provided by the user interface 660. A prompt 710 may prompt the user for the second type of information.

Figure 8:
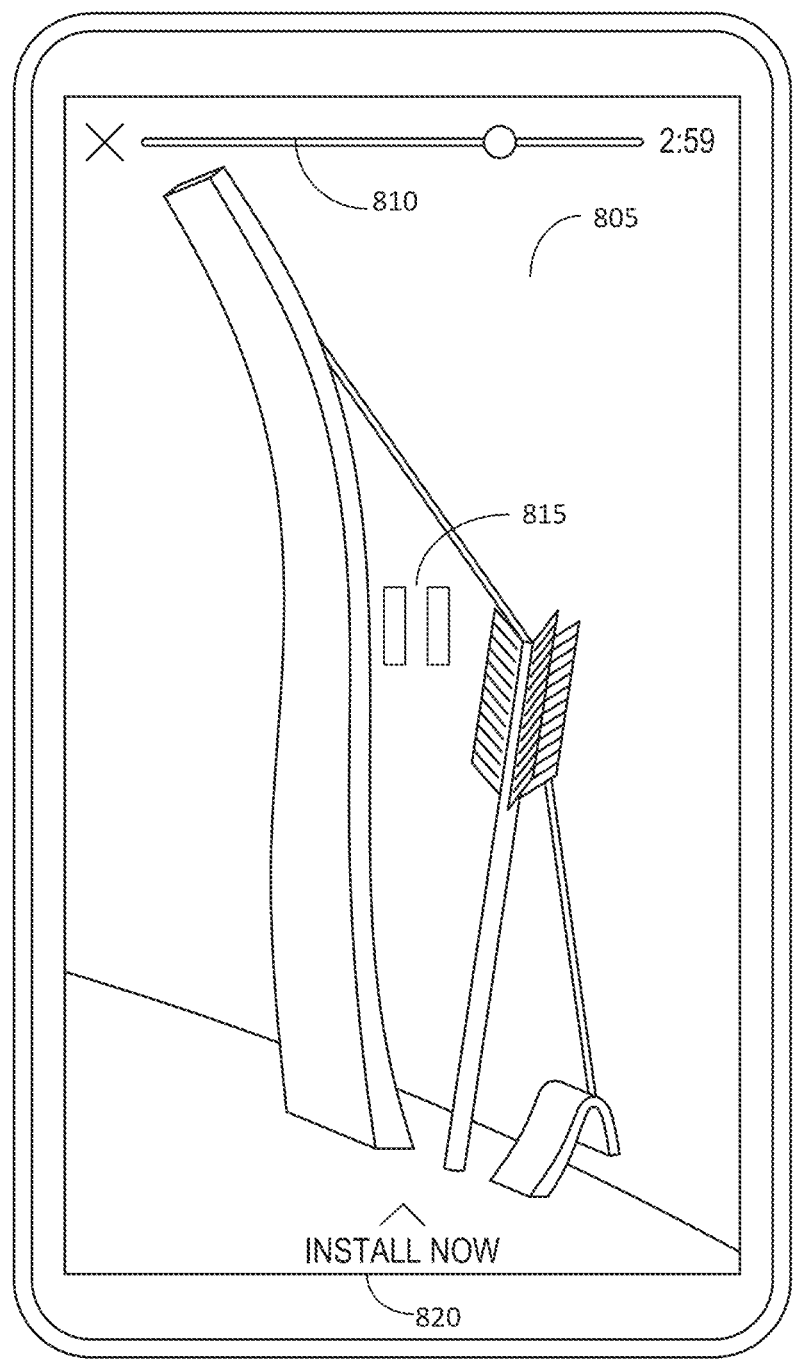
FIG. 8 is an exemplary method for determining a content consumption rate.

FIG. 8 is another exemplary embodiment of the user interface 640 of FIG. 6. The user interface 640 of FIG. 8 shows a video 805. The user interface 640 of FIG. 8 also shows a progress bar 810 for the video 805. A pause prompt 815 is also shown. As discussed above, the user interface 640 may accept at least two input types. Prompt 820 prompts the user for the second type of input, which may indicate a request for the information provided by the user interface 660, as discussed above with respect to FIG. 6.

Figure 9:
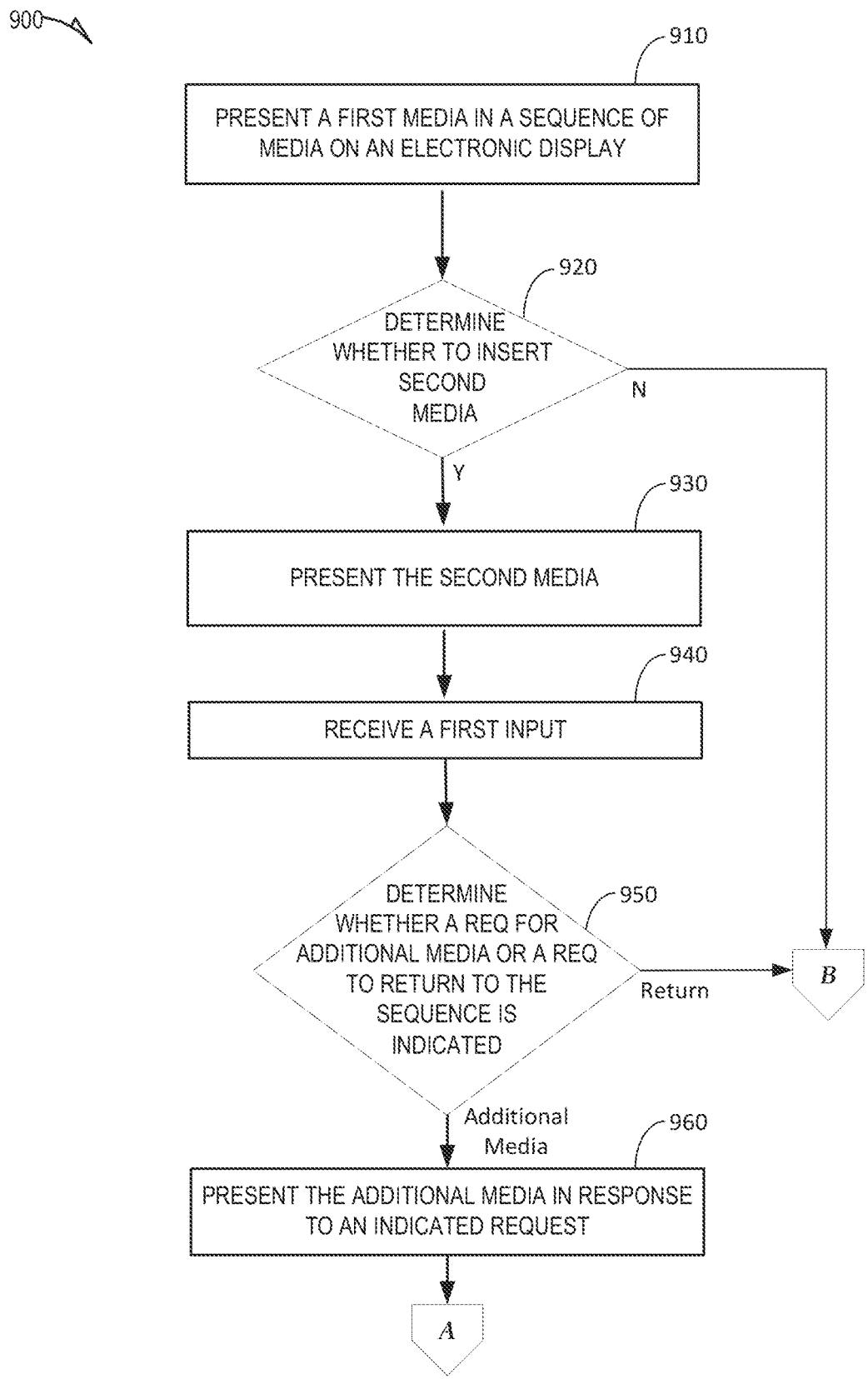
FIG. 9 is a flowchart of an exemplary method of conditional presentation of content to a user.

FIG. 9 is a flowchart for an exemplary method of selecting content. One or more of the functions discussed below with respect to process 900 and FIG. 9 may be performed by an electronic hardware processor. For example, instructions stored in an electronic hardware memory may configure the electronic hardware processor to perform one or more of the functions discussed below. For example, in some aspects, instructions stored in the messaging client application 104, and/or one or more of the content sequencing component 402, insertion component 404, input control component 406, and/or presentation component 408, may configure a hardware processor, such as the processing unit 1154 of FIG. 11 or the processor 1204 of FIG. 12 to perform one or more of the functions discussed below.

In block 910, a sequence of media to present on an electronic display is determined. In some aspects, the sequence of media is presented to a user on a touchscreen of an electronic device, such as a mobile device. In some aspects, the determination may be in response to a user interface selection input, selecting a source of the sequence of media. For example, a user may select an event gallery or an event story. The selected event gallery or event story may be the source for the sequence of media. The sequence of content may be defined by the event gallery or event story. For example, the sequence may be defined based on a sequence in which the media included in the gallery or story were added to the event gallery or event story. Alternatively, the sequence may be defined by a chronological order in which the media was created, edited, or captured. The sequence of media may include two or more media. The media may be any combination of videos, gifs, photos, documents, images, or any media type.

In block 920, a determination is made to present second media between two media of the sequence of media. In some aspects, the determination may be based on an elapsed time since a previous insertion of media into the sequence has been performed. In some aspects, the determination to insert the second media may be based on a content consumption rate of the user. For example, if the user is consuming content at a rate below a rate threshold, and an elapsed time since a previous insertion is above a time threshold, then a determination to insert the second media may be made, and process 900 may move to block 930. Otherwise, the insertion may not be performed, and process 900 may transition via off-page reference B to block 960.

In block 930, the second media is presented between the two media. As shown above with respect to FIG. 6, in some aspects, a user interface, such as user interface 620 may present the second media (e.g. 504). The user interface 620 may be configured to accept two or more types of input in some aspects.

In block 940, a first input is received. As discussed above, the user interface 620 may be configured to receive at least two types of input. The input may be, in some aspects, a gesture entered on a touch screen display, such as that used by a smartphone.

Decision block 950 determines whether the input of block 940 requests additional media or requests to return to the sequence of media. If the input requests to return to the sequence of media, process 900 transitions through off-page reference B to present further media in the sequence, as explained below. If the input requests the presentation of additional media, process 900 moves from block 950 to block 960. As discussed above, the example sequence 600 may transition from the user interface 620 to the user interface 640 upon receiving a particular input, such as an exemplary "swipe up" gesture, such as input 630 in FIG. 6.

Once presented, the user interface 640 may provide for at least two further inputs. The user interface 640 may be configured to, for example, receive a first input indicating that a return in user interface 620 is requested. A second input may indicate a transition to user interface 660 is requested.

Figure 10:
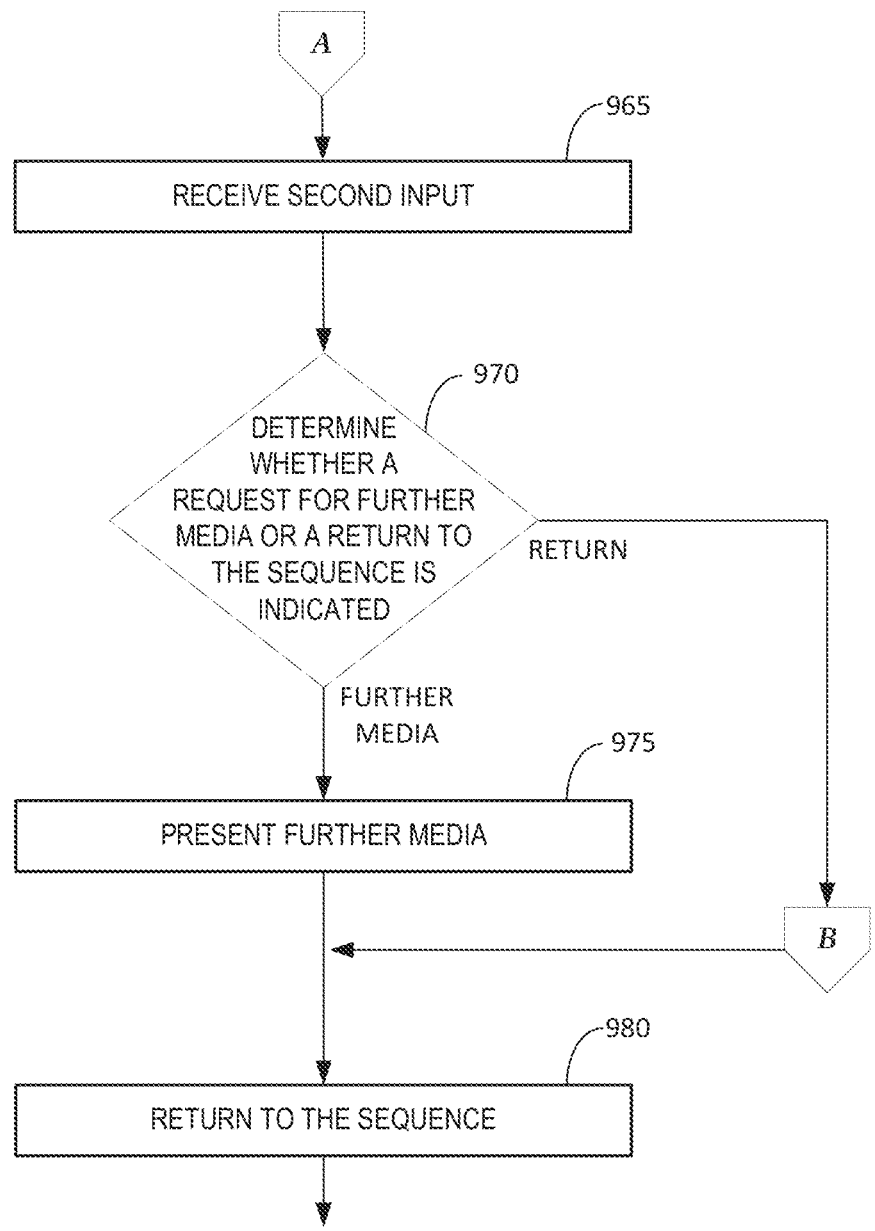
FIG. 10 is a continuation of the flowchart of FIG. 9, including a flowchart of an exemplary method for conditional presentation of content to a user.

After the additional media is presented in block 960, process 900 transitions via off page reference A to block 965 of FIG. 10. In block 965, a second input is received. The second input may be, in some aspects, a gesture on a touchscreen. For example, the second input may correspond to a "swipe left" or "swipe down" gesture in some aspects on the user interface 640. Decision block 970 determines whether the second input requests further media be displayed, or a return to the sequence of media is requested. If a return to the sequence is requested, process 900 moves from block 970 to block 980. Block 980 may present a next media in the sequence after the first media. For example, as shown with respect to FIGS. 5-6, after media 502*b* in the sequence of 502*a-d* is presented, media 504 is inserted. After media 504, the sequence returns by presentation of media 502*c*, which is immediately subsequent to media 502*b* in the sequence of media 502*a-d*.

If further media is requested by the second input, process 900 moves from block 970 to block 975, which presents the further media. In some aspects, the further media may be presented in a user interface such as user interface 660, discussed above with respect to FIG. 6.

Software Architecture

Figure 11:
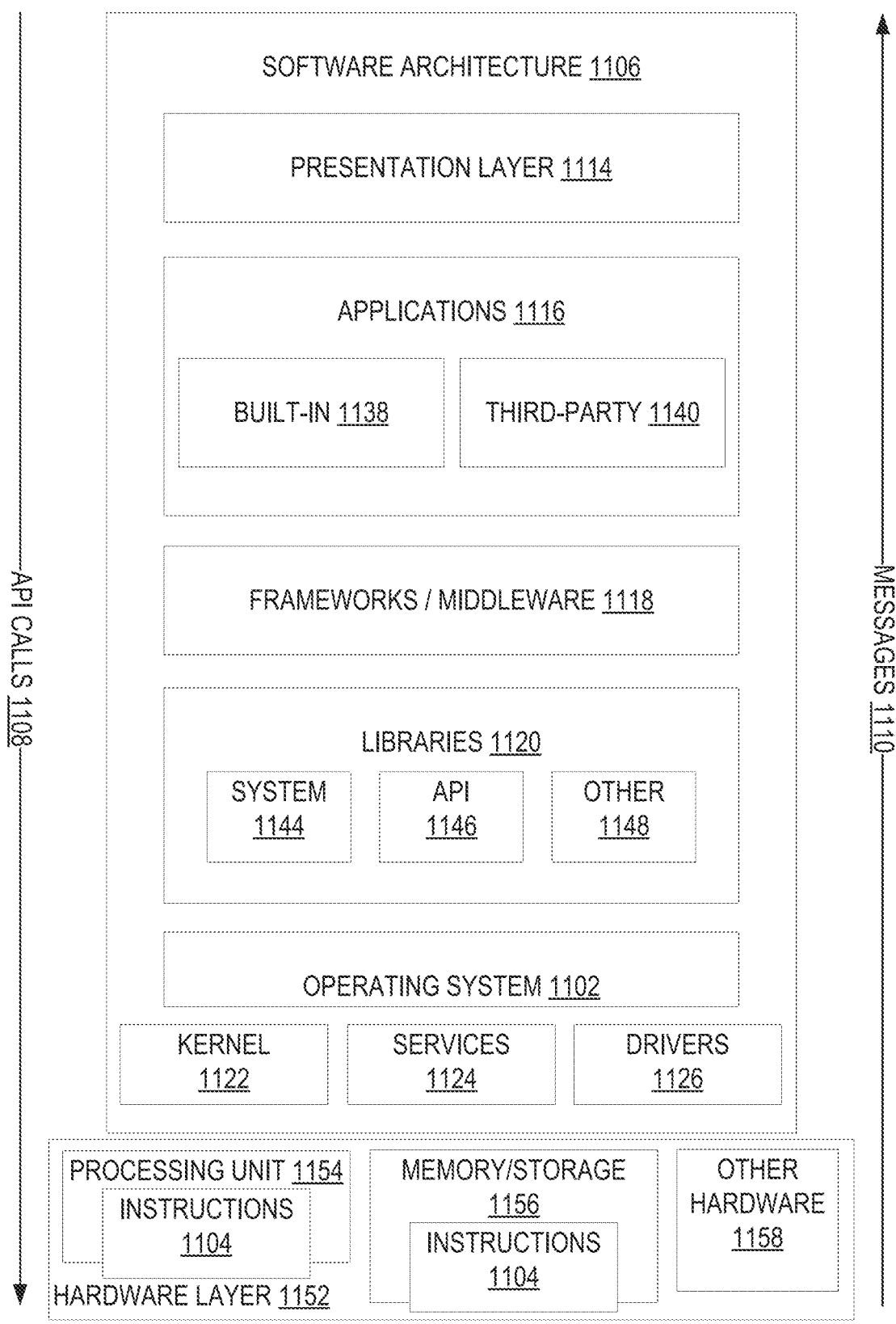
FIG. 11 is a block diagram illustrating an example software architecture

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as a machine 1200 of FIG. 12 that includes, among other things, processors 1204, memory/storage 1206, and I/O components 1218. A representative hardware layer 1152 is illustrated and can represent, for example, the machine 1200 of FIG. 12. The representative hardware layer 1152 includes a processing unit 1154 having associated executable instructions 1104. The executable instructions 1104 represent the executable instructions of the software architecture 1106, including implementation of the methods, components, and so forth described herein. For example, the instructions 1104 may configure the processing unit 1154 to perform one of more of the functions discussed above with respect to process 900, discussed above with respect to FIGS. 9 and 10 respectively. The hardware layer 1152 also includes memory and/or storage 1156, which also have the executable instructions 1104. The hardware layer 1152 may also comprise other hardware 1158.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive a response as messages 1110. The layers illustrated are representative in nature and not all software architectures have all layers. For example, some mobile or special-purpose operating systems may not provide a frameworks/middleware 1118 layer, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than by interfacing directly with the underlying operating system 1102 functionality (e.g., kernel 1122, services 1124, and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. The third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as the operating system 1102) to facilitate functionality described herein.

The applications 1116 may use built-in operating system functions (e.g., kernel 1122, services 1124, and/or drivers 1126), libraries 1120, and frameworks/middleware 1118 to create user interfaces to interact with users of the system. Alternatively, or additionally, in some systems interactions with a user may occur through a presentation layer, such as the presentation layer 1114. In these systems, the application/component "logic" can be separated from the aspects of the application/component that interact with a user. The applications 1116 may include instructions 1104 that implement the methods discussed herein, such as those discussed above with respect to FIGS. 9 and/or 10.

Exemplary Machine

Figure 12:
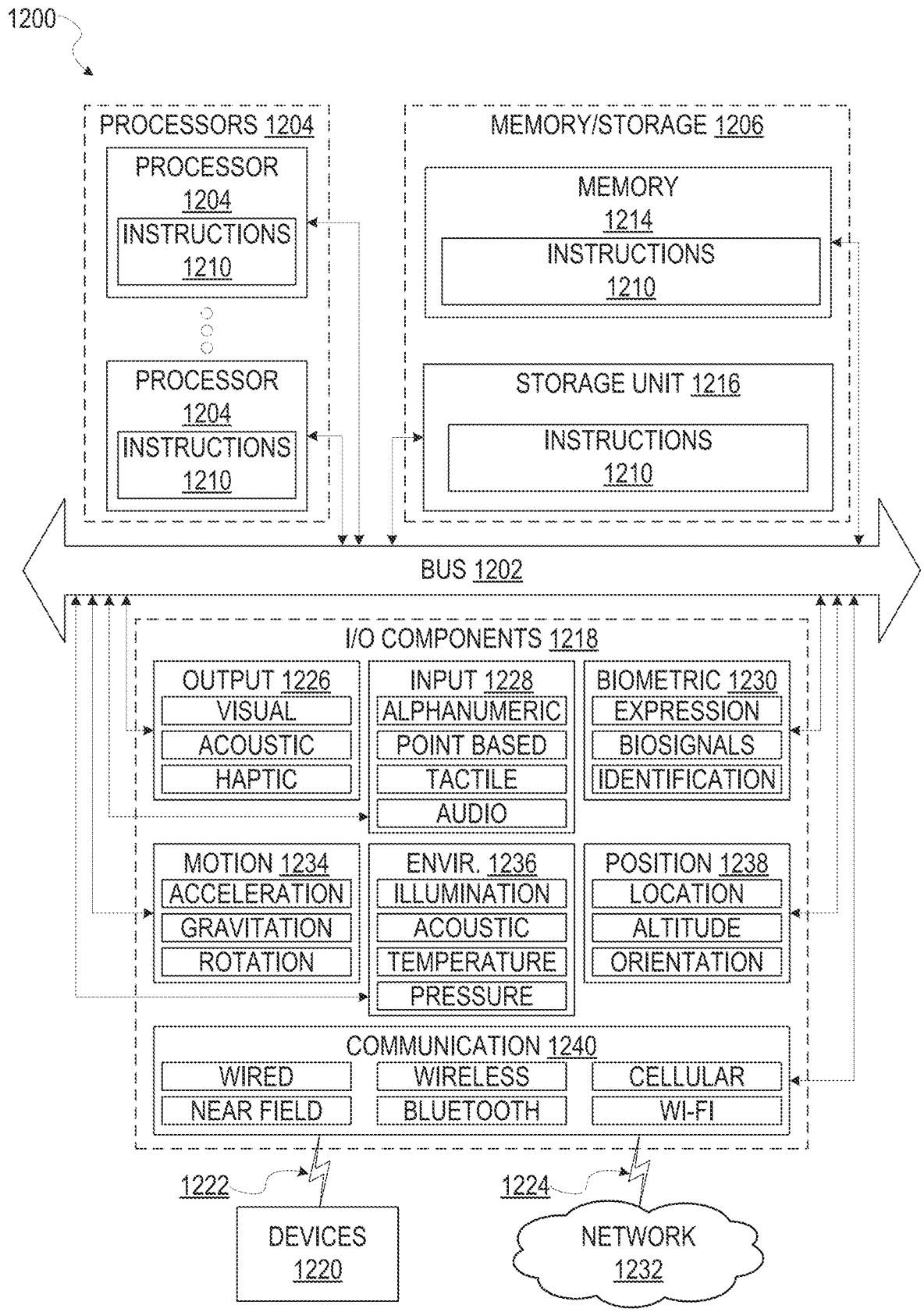
FIG. 12 is a block diagram illustrating exemplary components (also referred to herein as "modules") of a machine.

FIG. 12 is a block diagram illustrating exemplary components (also referred to herein as "modules") of a machine 1200. In some aspects, the machine is configured to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. For example, the instructions 1210 may implement the content selection system 208 in some aspects, which may include, in some of these aspects, one or more of the functions discussed above with respect to FIGS. 9 and 10. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of the processors 1204 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1218 may include a wide variety of components to provide a user interface for receiving input, providing output, producing output, transmitting information, exchanging information, capturing measurements, and so on. The specific I/O components 1218 that are included in the user interface of a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various exemplary embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1228 may also include one or more image-capturing devices, such as a digital camera for generating digital images and/or video.

In further exemplary embodiments, the I/O components 1218 may include biometric components 1230, motion components 1234, environment components 1236, or position components 1238, as well as a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via a coupling 1224 and a coupling 1222 respectively. For example, the communication components 1240 may include a network interface component or other suitable device to interface with the network 1232. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document:

I claim:

1. An apparatus for presenting content on an electronic display, comprising:
    one or more electronic hardware processors;
    an electronic hardware memory, operably connected to the one or more electronic hardware processors, and storing instructions that configure the one or more electronic hardware processors to perform operations comprising:
    identifying a sequence of media items to present on the electronic display;
    presenting, by a device, a first video, having a first duration, between two media items of the sequence of media items;

receiving touch input comprising a first swipe gesture while the first video is presented;

in response to receiving the touch input, presenting a second video in a user interface comprising information related to the first video; and in response to detecting a second swipe gesture while the second video is presented:

pausing playback of the second video at a pause point;

after pausing playback of the second video at the pause point, presenting a pause prompt together with an installation dialog that enables installation of software on the device; and presenting further media associated with the installation dialog in a second user interface, wherein the playback of the second video resumes from the pause point in response to transitioning back to the user interface that presents the second video.

2. The apparatus of claim 1, wherein the operations further comprise:

presenting, on a first user interface configured to receive at least two types of touch input, the first video between the two media items in response to determining that one or more criteria satisfy a threshold, a first type of the two types of touch input corresponding to a request for additional content and a second type of the two types of touch input corresponding to a request to return to the sequence of media items, wherein the first type of touch input comprises first and second swipe up gestures that each respectively controls sequencing through a plurality of additional content, the second video comprising a similar subject as the first video.

3. The apparatus of claim 1, wherein the operations further comprise presenting together with the installation dialog and the pause prompt a progress bar for the second video that has been paused.

4. The apparatus of claim 1, wherein the operations further comprise determining an amount of time since a user registered with a messaging application, wherein the first video is presented in response to determining that the amount of time transgresses a threshold.

5. The apparatus of claim 1, wherein the operations further comprise determining one or more content items are scheduled for automatic deletion within a threshold period of time at a time prior to ending presentation of a sequence of media items, wherein the first video is presented in response to determining that the one or more content items are scheduled for automatic deletion within the threshold period of time.

6. The apparatus of claim 1, wherein the operations further comprise:

determining a view rate of content included the sequence of media items based on a number of content within the sequence of media items viewed over a period of time;

estimating a view time of each content in the sequence of media items that has not yet been viewed;

comparing the estimated view time of each content in the sequence of media items to a content deletion time of a given content item in the sequence of media items that has not yet been viewed, the content deletion time corresponding to a time at which the given content item will be automatically deleted; and in response to determining that the estimated view time for a particular content is after the content deletion time of the given content, modifying an order of the content in the sequence of media items to advance playback of the given content in the sequence of media items.

7. The apparatus of claim 1, wherein the operations further comprise automatically selecting the second video from a subset of videos limited to videos that are longer than the first video and that comprise information on a subject related to that of the first video.

8. The apparatus of claim 1, the operations further comprising reordering a display sequence for the sequence of media items based on an estimated view time and estimated deletion time of a message included in the sequence of media items, and displaying the sequence of media items in accordance with the reordered display sequence.

9. The apparatus of claim 1, wherein the operations further comprise in response to receiving the first swipe gesture while the first video is presented, extending an amount of time remaining to access the content before the content is automatically deleted, the extending of the amount of time causing the content to be automatically deleted at a second time that is later than a first time.

10. A method comprising:

identifying a sequence of media items to present on an electronic display;

presenting, by a device, a first video having a first duration between two media items of the sequence of media items;

receiving touch input comprising a first swipe gesture while the first video is presented;

in response to receiving the touch input, presenting a second video in a user interface comprising information related to the first video; and in response to detecting a second swipe gesture while the second video is presented:

pausing playback of the second video at a pause point;

after pausing playback of the second video at the pause point, presenting a pause prompt together with an installation dialog that enables installation of software on the device; and presenting further media associated with the installation dialog in a second user interface, wherein the playback of the second video resumes from the pause point in response to transitioning back to the user interface that presents the second video.

11. The method of claim 10, further comprising determining an amount of time since a user registered with a messaging application, wherein the first video is presented in response to determining that the amount of time reaches a threshold.

12. The method of claim 10, further comprising determining that one or more content items are scheduled for automatic deletion within a threshold period of time at a time prior to ending presentation of the sequence of media items, wherein the first video is presented in response to determining that the one or more content items are scheduled for automatic deletion within the threshold period of time.

13. The method of claim 10, further comprising:

determining a view rate of content included in sequence of media items based on a number of content within the sequence of media items viewed over a period of time;

estimating a view time of each content in the sequence of media items that has not yet been viewed;

comparing the estimated view time of each content in the sequence of media items to a content deletion time of a given content item in the sequence of media items that has not yet been viewed, the deletion time corresponding to a time at which the given content item will be automatically deleted; and in response to determining that the estimated view time for a particular content is after the content deletion time of the given content, modifying an order of the content in the sequence of media items to advance playback of the given content in the sequence of media items.

14. A non-transitory computer readable medium comprising instructions that when executed cause one or more hardware processors to perform operations comprising:
   identifying a sequence of media items to present on an electronic display;
   presenting, by a device, a first video having a first duration between two media items of the sequence of media items;
   receiving touch input comprising a first swipe gesture while the first video is presented;
   in response to receiving the touch input, presenting a second video in a user interface comprising information related to the first video; and
   in response to detecting a second swipe gesture while the second video is presented:
      pausing playback of the second video at a pause point;
      after pausing playback of the second video at the pause point, presenting a pause prompt together with an installation dialog that enables installation of software on the device; and
      presenting further media associated with the installation dialog in a second user interface, wherein the playback of the second video resumes from the pause point in response to transitioning back to the user interface that presents the second video.

15. The non-transitory computer readable medium of claim 14, the operations further comprising determining an amount of elapsed time since a previous insertion of additional media, wherein the first video is presented in response to determining that the amount of elapsed time transgresses a threshold.

16. The non-transitory computer readable medium of claim 14, the operations further comprising determining an amount of time since a user registered with a messaging application, wherein the first video is presented in response to determining that the amount of time transgresses a threshold.

17. The non-transitory computer readable medium of claim 14, the operations further comprising determining that one or more content is scheduled for automatic deletion within a threshold period of time at a time prior to ending presentation of the sequence of media items, wherein the first video is presented in response to determining that the one or more content is scheduled for automatic deletion within the threshold period of time.

18. The non-transitory computer readable medium of claim 14, the operations further comprising:
   determining a view rate of content included in the sequence of media items based on a number of content within the sequence of media items viewed over a period of time;
   estimating a view time of each content in the sequence of media items that has not yet been viewed;
   comparing the estimated view time of each content in the sequence of media items to a content deletion time of a given content item in the sequence of media items that has not yet been viewed, the deletion time corresponding to a time at which the given content item will be automatically deleted; and
   in response to determining that the estimated view time for a particular content is after the content deletion time of the given content, modifying an order of the content in the sequence of media to advance playback of the given content in the sequence of media items.

19. The non-transitory computer readable medium of claim 14, the operations further comprising reordering a display sequence for the sequence of media items based on an estimated view time and estimated deletion time of a message included in the sequence of media, and displaying the sequence of media items in accordance with the reordered display sequence.

20. The non-transitory computer readable medium of claim 14, wherein the operations further comprise suspending an ephemeral timer of content in the sequence of media items in response to receiving the first swipe gesture while the first video is presented, wherein suspending the ephemeral timer comprises adjusting time information of the content to extend an amount of time remaining to access the content before the content is automatically deleted.

* * * * *